US011719995B2

(12) United States Patent
George et al.

(10) Patent No.: US 11,719,995 B2
(45) Date of Patent: Aug. 8, 2023

(54) OPTICAL DIGITAL TO ANALOG CONVERTER USING ELECTRO-MODULATED WAVEGUIDES

(71) Applicant: The George Washington University, Washington, DC (US)

(72) Inventors: Jonathan K. George, Arlington, VA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 1 day.

(21) Appl. No.: 17/543,190

(22) Filed: Dec. 6, 2021

(65) Prior Publication Data

US 2022/0091475 A1    Mar. 24, 2022

Related U.S. Application Data

(63) Continuation of application No. 16/439,268, filed on Jun. 12, 2019, now Pat. No. 11,221,541.

(60) Provisional application No. 62/683,940, filed on Jun. 12, 2018.

(51) Int. Cl.
*G02F 7/00* (2006.01)
*G02F 1/035* (2006.01)

(52) U.S. Cl.
CPC ............. *G02F 7/00* (2013.01); *G02F 1/035* (2013.01); *G02F 2202/105* (2013.01)

(58) Field of Classification Search
CPC ....... G02F 1/035; G02F 2202/105; G02F 7/00
See application file for complete search history.

(56) References Cited

U.S. PATENT DOCUMENTS

| | | |
|---|---|---|
| 3,985,423 A | 10/1976 | Tseng |
| 5,297,225 A | 3/1994 | Snow |
| 5,511,142 A | 4/1996 | Horie |
| 5,694,134 A | 12/1997 | Barnes |
| 5,858,925 A | 1/1999 | Drewes |
| 5,987,199 A | 11/1999 | Zarian |
| 6,100,420 A | 8/2000 | Drewes |
| 6,289,150 B1 | 9/2001 | Zarian |
| 6,395,683 B1 | 5/2002 | Drewes |
| 6,459,519 B1 | 10/2002 | Sasai |
| 6,563,398 B1 | 5/2003 | Wu |
| 7,061,414 B2 | 6/2006 | Chen |
| 7,142,750 B2 | 11/2006 | Shahar |

(Continued)

*Primary Examiner* — Andrew Jordan
(74) *Attorney, Agent, or Firm* — Blank Rome LLP (57) ABSTRACT

A digital-to-analog converter has a first interface coupled to a second interface through one or more modulation circuits. The circuits include a first coupler connected to the first interface; a first waveguide with a first lead connected to the first coupler, a first end, and a first length running therebetween. The first lead and the first end are coupled by a first switch. The circuits also include: a second coupler connected to the first interface; a second waveguide having a second lead connected to the second coupler, a second end, and a second length running therebetween, the second lead and the second end coupled by a second switch along the second length; and an optical combiner connected to the ends of the waveguides. The second interface is connected to the optical combiner of the modulation circuits. Output from the second interface is an optical signal capable of carrying binary information.

20 Claims, 9 Drawing Sheets

(56) References Cited

U.S. PATENT DOCUMENTS

| | | |
|---|---|---|
| 7,155,086 B2 | 12/2006 | Saida |
| 7,177,500 B2 | 2/2007 | Shahar |
| 7,272,271 B2 | 9/2007 | Kaplan |
| 8,009,995 B2 | 8/2011 | Marc |
| 9,235,101 B2 | 1/2016 | Silverstone |
| 9,490,902 B2 | 11/2016 | Goodwill |
| 9,529,158 B2 | 12/2016 | Sorger et al. |
| 9,755,291 B2 | 9/2017 | Legay |
| 9,865,986 B2 | 1/2018 | Galvanauskas |
| 9,989,831 B2 | 6/2018 | Pruessner |
| 10,003,430 B2 | 6/2018 | Shimizu |
| 10,261,388 B2 | 4/2019 | Pruessner |
| 10,312,657 B2 | 6/2019 | Galvanauskas |
| 10,481,463 B2 | 11/2019 | Nejadriahi |
| 10,534,189 B2 | 1/2020 | Miller |
| 10,564,345 B2 | 2/2020 | Crompvoets |
| 10,564,512 B2 * | 2/2020 | Sun .................. H04Q 11/0005 |
| 2001/0022878 A1 | 9/2001 | Saida |
| 2003/0030868 A1 | 2/2003 | Sasai |
| 2004/0028418 A1 | 2/2004 | Kaplan |
| 2004/0131239 A1 | 7/2004 | Shahar |
| 2004/0184804 A1 | 9/2004 | Shahar |
| 2005/0074199 A1 | 4/2005 | Shahar |
| 2005/0168364 A1 | 8/2005 | Chen |
| 2006/0034569 A1 | 2/2006 | Shih |
| 2007/0159369 A1 | 7/2007 | Currie |
| 2007/0189031 A1 | 8/2007 | Delmar |
| 2008/0050068 A1 | 2/2008 | Levner |
| 2012/0251032 A1 | 10/2012 | Kato |
| 2013/0028552 A1 | 1/2013 | DeSalvo |
| 2014/0169723 A1 | 6/2014 | Kato |
| 2014/0299743 A1 | 10/2014 | Miller |
| 2015/0123863 A1 | 5/2015 | Legay |
| 2015/0234138 A1 | 8/2015 | Sorger |
| 2015/0021058 A1 | 9/2015 | Silverstone |
| 2015/0263190 A1 | 9/2015 | Knights |
| 2016/0204878 A1 | 7/2016 | Goodwill |
| 2016/0315441 A1 | 10/2016 | Galvanauskas |
| 2017/0212295 A1 | 7/2017 | Vasylyev |
| 2017/0238854 A1 | 8/2017 | Henshaw |
| 2017/0255077 A1 | 9/2017 | Pruessner |
| 2018/0026418 A1 | 1/2018 | Galvanauskas |
| 2018/0084320 A1 | 3/2018 | Martinho |
| 2018/0246391 A1 | 8/2018 | Sun et al. |
| 2018/0252983 A1 | 9/2018 | Pruessner |
| 2019/0072833 A1 | 3/2019 | Nejadriahi et al. |
| 2019/0244079 A1 | 8/2019 | George |
| 2019/0261070 A1 | 8/2019 | Martinho |
| 2019/0302363 A1 * | 10/2019 | Goi ..................... G02B 6/122 |
| 2019/0324191 A1 | 10/2019 | Crompvoets |
| 2019/0377237 A1 | 12/2019 | George |
| 2022/0091475 A1 * | 3/2022 | George .................. G02F 7/00 |

\* cited by examiner

OPTICAL DIGITAL TO ANALOG CONVERTER USING ELECTRO-MODULATED WAVEGUIDES

CROSS-REFERENCE TO RELATED APPLICATION

This application is a continuation application of U.S. patent application Ser. No. 16/439,268, filed on Jun. 12, 2019, which claims priority benefit of U.S. Provisional Application No. 62/683,940, which was filed on Jun. 12, 2018. The contents of these applications are incorporated herein by reference in their entirety. U.S. application Ser. No. 16/439,268 is related to U.S. Pat. No. 9,529,158 to Sorger, which issued on Dec. 27, 2006, and which is fully incorporated by reference herein.

TECHNICAL FIELD

The present disclosure relates generally to devices and methods for converting digital signals into analog signals. More specifically, the present disclosure relates to devices, systems, and methods for converting digital electronic signals into analog photonic signals without the need to convert an incoming digital electrical signal to an analog electrical signal.

BACKGROUND

Interfacing optical analog systems to digital electronic systems requires the conversion of a digital electronic signal to an analog optical signal. Attempts to minimize output noise when interfacing optical analog systems with digital electronic systems have not been wholly satisfactory. Hence, there is room for improvement in the art.

SUMMARY OF THE INVENTION

A digital-to-analog converter is provided that has a first interface coupled to a second interface through one or more modulation circuits. The circuits include a first coupler connected to the first interface; a first waveguide with a first lead connected to the first coupler, a first end, and a first length running therebetween. The first lead and the first end are coupled by a first switch. The circuits also include: a second coupler connected to the first interface; a second waveguide having a second lead connected to the second coupler, a second end, and a second length running therebetween, the second lead and the second end coupled by a second switch along the second length; and an optical combiner connected to the ends of the waveguides. The second interface is connected to the optical combiner of the modulation circuits. Output from the second interface is an optical signal capable of carrying binary information.

BRIEF DESCRIPTION OF THE DRAWINGS

For a detailed description of various examples, reference will now be made to the accompanying drawings, in which.

DETAILED DESCRIPTION

In the following description, for purposes of explanation, numerous specific details are set forth in order to provide a thorough understanding of the examples disclosed herein. The disclosed example implementations may in some instances be practiced without these specific details. In other instances, structure and devices are shown in block diagram form to avoid obscuring the disclosed examples.

When introducing elements of various examples of the present disclosure, the articles "a," "an," and "the" are intended to mean that there are one or more of the elements. The terms "comprising," "including," and "having" are intended to be inclusive and mean that there can be additional elements other than the listed elements. The examples discussed are illustrative in nature and should not be construed to imply that the specific examples described herein are preferential in nature.

The examples described in this disclosure are neither mutually exclusive nor collectively exhaustive. References to "one example" or "an example" are not to be interpreted as excluding the existence of additional examples that also incorporate the recited features.

Interfacing optical analog systems to digital electronic systems requires the conversion of a digital electronic signal to an analog optical signal. This has been achieved in the past by first converting the digital electronic signal to an analog electronic signal and then converting the analog electronic signal to an optical analog signal with an electro-optic modulator. The disadvantage of this approach is that it requires summing in electronics where it is difficult to achieve linear sums at high speed with varying voltage or current. Summing different voltage or current levels at high speed results in nonlinear summation, resulting in output noise. Summing signals in optics is extremely linear and does not result in this problem. The present disclosure obviates the need for an electronic digital to analog converter, thereby reducing both the complexity of optical analog systems and attendant noise.

Digital-to-analog converters are indispensable functional units in signal transmission and essential component for the optical computing. In at least one example of this disclosure, a photonic digital-to-analog converter converts electrical digital signals to an optical analog. Technical advantages to this approach include lowering system footprint, reducing power needed, and lower cost than conventional systems. Another technical advantage of at least one digital-to-analog converter of this disclosure is that the digital-to-analog converter addresses the increasing bandwidth needs of communications and control systems. In at least one example, a sampling rate of a communications or control system can be raised to 100 GHz. In at least one example of this disclosure, a 4-bit digital-to-analog converter includes one or more asymmetrical directional couplers and one or more Y-combiners.

In at least one example of this disclosure, an optical digital-to-analog converter can include one or more waveguides. The waveguides can be composed of silicon on an insulator (SOI). Such waveguides are monocrystalline silicon sitting on silicon oxide (the insulator). After fabrication, the waveguides can be covered in an oxide layer.

Figure 1:
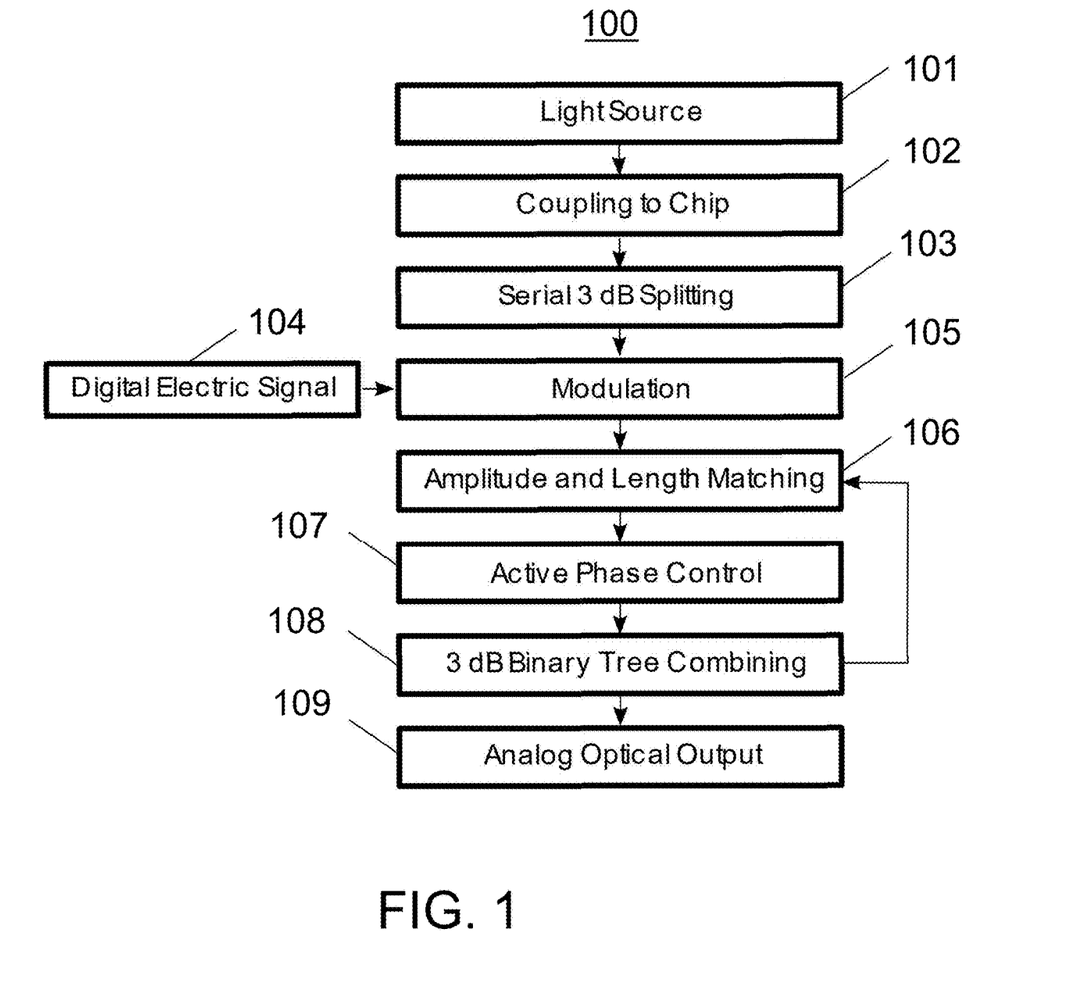
FIG. 1 illustrates a method of converting digital electronic signals into analog photonic signals in accordance with an example of this disclosure.

FIG. 1 illustrates a method 100 of converting digital electronic signals into analog photonic signals in accordance with an example of this disclosure. At step 101 light is received at an input of a system (such as an integrated circuit or system on a chip). At step 102, light from the light source is coupled using one or more couplers to the system (chip). As light is received 102 onto the chip, the chip also receives 104 a digital electrical signal. The light from the light source is then split 103 by a series of serial 3-dB couplers into sub-waves representing the bits of the digital signal from the most significant bit to the least-significant-bit.

According to the method 100, each subsequent seriated 3-dB coupler has half the output power of the previous coupler, and thus each bit from most significant bit to least significant bit represents an analog system of one-half the power of the previous bit. The digital electronic signal is fed 104 into the chip where each bit of the electronic signal is used to modulate 105 each of the split optical signals from the couplers. Modulation 105 is achieved by switching off or on each of the optical signals with a corresponding digital electrical signal using an electro-optic switch or electro-optic modulator (such as disclosed in U.S. Pat. No. 9,529,158).

Figure 2A:
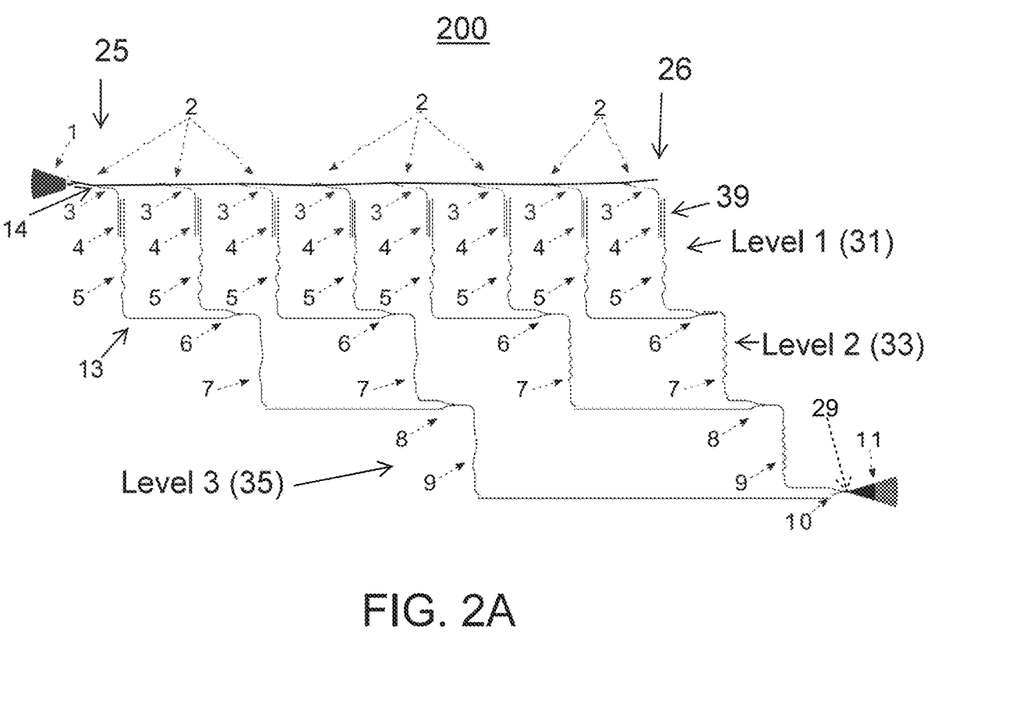
FIG. 2A illustrates a digital-to-analog converter in accordance with an example of this disclosure.
Figure 2B:
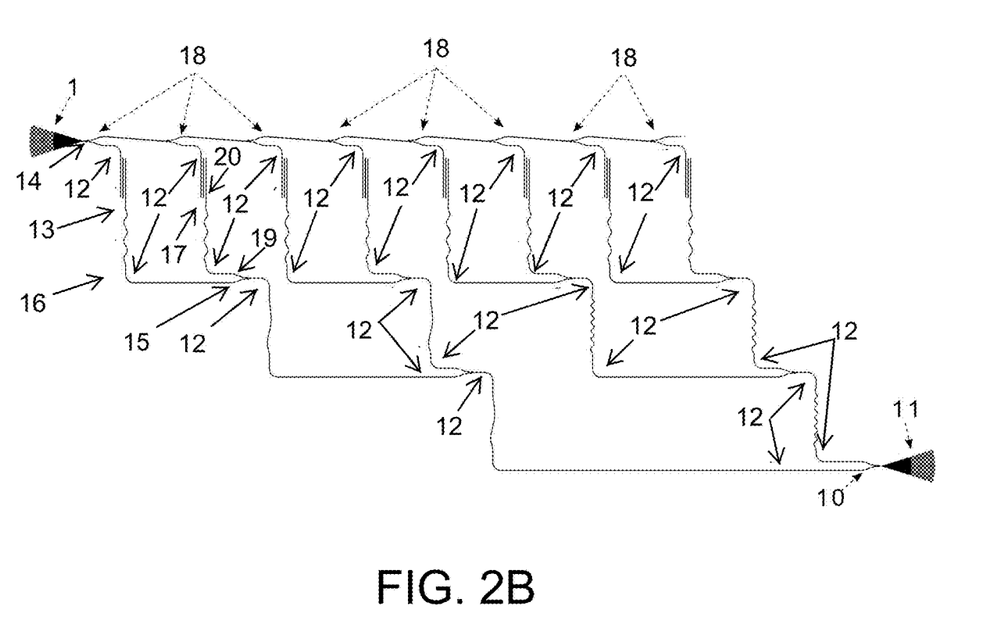
FIG. 2B illustrates aspects of the digital-to-analog converter of FIG. 2A.
Figure 2C:
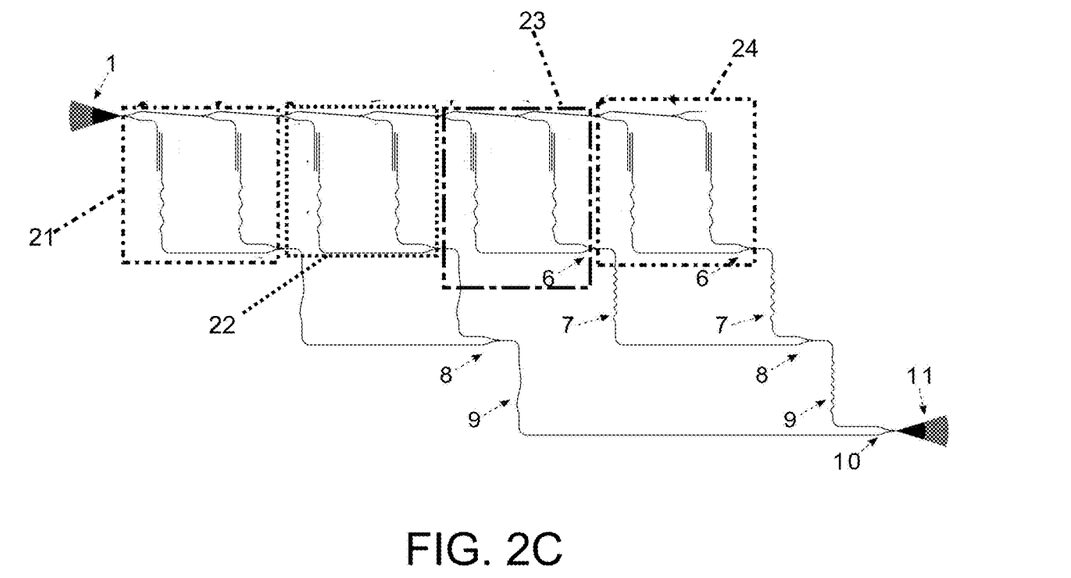
FIG. 2C illustrates aspects of the digital-to-analog converter of FIG. 2AB.

The resulting modulated optical signals are combined in a binary tree of 3-dB optical combiners (see e.g., 6, 8, 10 FIGS. 2A-2C). At each combination it is important that phase and length are matched and each signal from most significant bit to least significant bit has exactly 3-dB less amplitude than the previous signal. Thus, at step 106, the method 100 implements amplitude and wave matching 106. Amplitude can be optimized 106 to match 3-dB by creating a notch in a waveguide where the notch scatters some amount of light out of the waveguide, (see FIGS. 2A-C and FIGS. 3A-C). As the notch impinges further on the waveguide, more light is lost and the amplitude of the resulting signal is reduced.

The optical signals must also be length matched 106 to align phase and delay. According to the method 100, length matching of the optical signals can be achieved with serpentine waveguides (see e.g., 5, 7, and 9 of FIGS. 2A-C). The method can also include actively controlling 107 the phase(s) of the modulated 105 optical signals. Active phase control 107 with electro-optic phase modulators can be used to keep phases aligned even as the temperature of the chip changes the phase of each output. After phase and length matching, the optical signals are summed 108 using 3-dB optical combiners. Steps 106, 107, and 108 can be repeated with amplitude tuning 106, phase 107, and length matching 106 at each level of the binary tree until only one 3-dB combiner combines the last two optical signals. At this point in the method 100 the optical signal is output 109 either to the analog system on chip or coupled off chip using a diffraction grating.

FIG. 2A illustrates a digital-to-analog converter 200 in accordance with an example of this disclosure. FIG. 2A shows a top plan view of a physical layout of a digital-to-analog converter 200 (e.g., on a photonic chip). The digital-to-analog converter 200 includes a grating coupler 1 which couples light into the chip 200. The digital-to-analog converter 200 includes a series of 3-dB couplers 2 which split the light into 3-dB amplitude signals from most significant bit 25 to least significant bit 26.

Amplitude tuning can be achieved with waveguide notches 3 to achieve exactly 3-dB of amplitude difference at each output of each of the seriated 3-dB couplers 2. Electro-optical amplitude modulators 4, (e.g., electro-optic switches), alternately turn on and turn off each optical signal according to a corresponding digital electronic signal (see 104, 105 of FIG. 1). The output of each electro-optical modulator 4 is fed into a serpentine portion 5 of a waveguide to compensate for length and phase differences between each output. The length of the serpentine waveguides 5 will vary from branch to branch depending on the layout of the digital-to-analog converter 200, correcting for the additional length in the opposite branch. The outputs of the electro-optical modulators 4 are combined (summed) using optical combiners 6 in order to produce a single analog output 29.

The digital-to-analog converter 200 thus forms a binary tree 39. The example binary tree 39 of FIG. 2A has three levels, level 1 (31), level 2 (33), and level 3 (35). Phase and length correction (see 106, 107 of FIG. 1) occurs at each level 31, 33, 35 of the binary tree 29 until only one output 29 (from combiner 10) is left. This output 29 is an optical signal with an amplitude representative of the electronic digital signal. The output 29 can be fed into the analog side of an integrated photonics chip or coupled to an external system with a grating coupler 11 as shown.

FIG. 2B and FIG. 2C illustrate aspects of the digital-to-analog converter 200 of FIG. 2A. FIG. 2B illustrates possible locations of thermal regulators. FIG. 2C illustrates how pairs of switch-controlled 4 waveguides (e.g., 13, 17) form modulation circuits (e.g., 21). The digital-to-analog converter 200 includes a first interface 1 (e.g., grating coupler) and a second interface 11 (e.g., grating coupler). The second interface 11 is coupled to the first interface 1 through a modulation circuit 21. The modulation circuit 21 includes a 3-dB coupler 2 (e.g., a first splitting coupler), which is connected to the first interface 1. The digital-to-analog converter 200 includes a plurality of modulation circuits 21, 22, 23, 24 (FIG. 2C). Modulation circuit 21 includes a pair of waveguides containing a first waveguide 13 with a front (input) end 14 connected to the first 3-dB coupler (see 2, FIG. 2A). The waveguide (e.g., 13) has a length 16 running between the input end 14 of the waveguide (e.g., 13) and an output end 15. A switch 4 is positioned along the length 16 of the waveguide 13 between the input end 14 of the waveguide 13 and the output end 15. Modulation circuit 21 includes a second 3-dB coupler 2 (e.g., a second splitting coupler), which is connected to the first interface 1. The second 3-dB coupler 2 of modulation circuit 21 is connected to a second waveguide 17.

The second waveguide 17 of the pair of waveguides of modulation circuit 21 is configured much like the first waveguide 13. The second waveguide 17 has a lead end 18 connected to the second 3-dB coupler 2. The second waveguide 17 has an output end 19, and a length 20 which runs between the lead end 18 and the output end 19. The second waveguide 17 has a switch 4 positioned along the length 20 of the second waveguide 17.

The first waveguide 13 and the second waveguide 17 are connected to an optical combiner 6. The second interface 11 is connected to the optical combiner 6 of the more modulation circuits 21, 22, 23, 24. As can be seen from FIG. 2C, modulation circuits 22, 23, and 24 are similar to modulation circuit 21. Thermal regulators 12 (e.g., heaters) can be used to adjust 106 photonic signal amplitude and length, and adjust 107 phase to compensate for thermal/temperature changes of a system on chip or integrated circuit of which the digital-to-analog converter 200 can be a part.

Figure 2D:
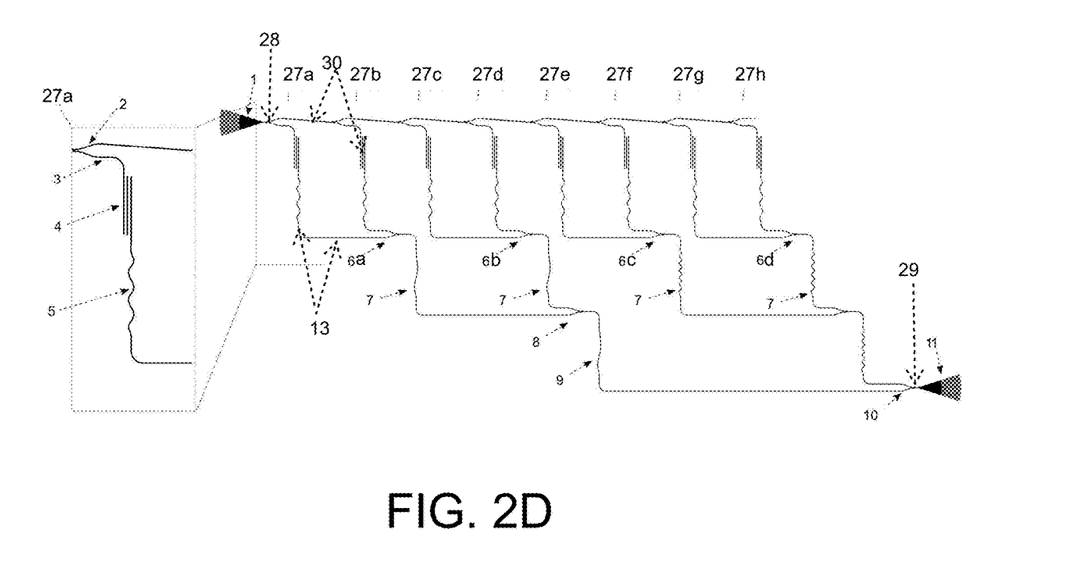
FIG. 2D illustrates aspects of the digital-to-analog converter of FIGS. 2A-C.

FIG. 2D illustrates aspects of the 8-bit digital-to-analog converter 200 of FIG. 2A. Unmodulated light from a source off the chip enters the device at the grating coupler 1. Next the light 28 received at the grating coupler 1 moves into a series of bit modulators 27a-27h, consisting of a splitter 2, a waveguide notch 3, an optical switch 4, and a serpentine waveguide 5. Each bit modulator 27a-27h corresponds to a bit in the digital signal from most significant bit 27a (see 25, FIG. 2B) to least significant bit 27h, (see 26, FIG. 2B). The light corresponding to the bit is split in two and travels down the lower waveguide (see 13, FIG. 2B). For example, in 27a half the light from the grating coupler is dropped into the bottom waveguide 5. The light dropped into the serpentine waveguide 5 portion of the waveguide (13) corresponds to half the amplitude of the final output 29 of the digital-to-analog converter 200 and represents by the most significant bit (25) of that final output. Next, light is attenuated by a notch 3 to balance the amplitude of the light that will eventually combine at 6. Moving onward, the light passes through an optical switch 4. The switch 4 is connected to an electronic digital signal that has a voltage applied to represent the binary bit. When the bit is 'on', the voltage in the switch will allow the light to pass onward. When the bit is 'off', the voltage in the switch will block or attenuate the light such that minimal light passes onward. Finally, the light passes through a serpentine waveguide 5, that compensates for the shorter path taken by the bottom waveguide 13 than the top 30 by adding length.

The above-described sequence of splitting, attenuating, modulating, and length compensating is repeated for each bit. Every bit has approximately half the light of the previous bit and corresponds to the next bit in a binary number having half the magnitude of the previous bit when moving from most significant bit to least significant bit. For example, when the digital number 237 is modulated by the optical DAC, the digital representation is applied as voltages 1110 1101 to optical switches in the bit modulators 27a-27h. The 27a switch will allow light to pass representing the magnitude $2^7$=128. The 27b switch will have half the amplitude of the previous corresponding to $2^6$=64. The 27c switch will again have half the magnitude of switch 27b corresponding to $2^5$=32 and will allow the light to pass. The 27d switch will have half the amplitude of the 27c switch corresponding to 24=16 and will block the light in this example because the fourth bit 4 is zero in the binary representation of 237. The 27e switch will have half the amplitude of the 27d switch corresponding to the magnitude of 23=8 and will allow the light to pass since the third bit is 1 in the case of 237. The light leaving the 27f switch will have half the amplitude of the light leaving the 27e switch, (corresponding to $2^2$=4) and will allow light to pass since bit no. 2 is 1 in the example of 237. The light from the 27g switch will have half the magnitude of the light from the 27f switch, (corresponding to $2^1$=2), and will block light because the first bit is zero. The output of the 27h switch will have half the magnitude of the 27g switch corresponding to $2^0$=1, and will allow light to pass since the $0^{th}$ bit in the binary representation of the number 237 is 1.

The light from the switches 4 then flows through a series of serpentine waveguides 5. Each serpentine waveguide 5 adds an additional fixed length to the branches such that the time traveled by light in each branch from when it enters the chip at the input grating coupler 1 to when it is combined is equal. After length compensation, each branch is combined with 3-dB combiners 6.

Thus, when the digital-to-analog converter 200 modulates 237 (binary), light representing one hundred and twenty-eight (128) is combined with sixty-four (64) in the first combiner 6a; light representing 32 is combined with 0 in the second combiner 6b, light representing 8 is combined with 4 in the third combiner 6c, and 0 is combined with light representing 1 in the last combiner 6d of the first layer of combiners.

Thereafter the light is again length compensated with serpentine waveguides 7 and combined using combiners 8. In the example of 237, light representing 192 is combined with 32 in the first combiner and light representing 12 and 1 is combined in the second combiner. This compensation and combining repeats until there are only two branches left which are again length compensated with serpentine waveguides 9 and combined at the final combiner 10. In our example of 237, light representing 224 and 13 is combined for a final value of light representing 237. The amplitude of the electric field of the light from the final combiner 10 is the analog optical signal 29 representing the bits of the digital electronic signal, corresponding to the binary representation of 237 (base 10). This modulated analog output 29 exits the chip (200) at the output grating coupler 11.

Figure 3A:
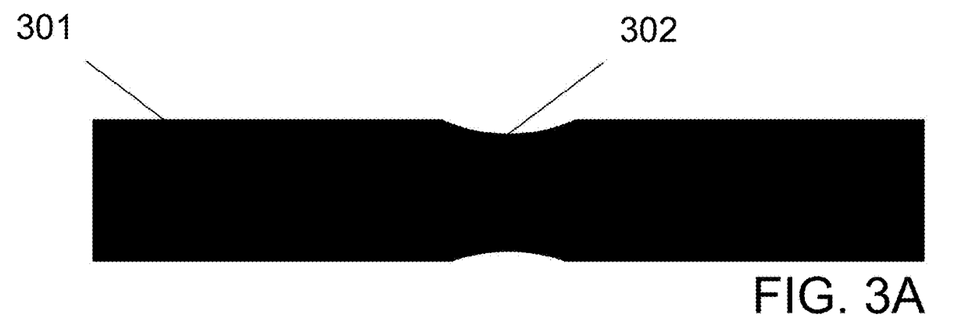
FIG. 3A illustrates a waveguide in accordance with an example of this disclosure.
Figure 3B:
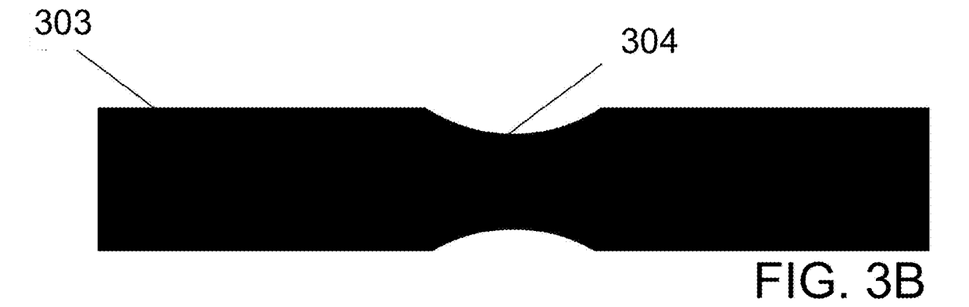
FIG. 3B illustrates another waveguide in accordance with an example of this disclosure.
Figure 3C:
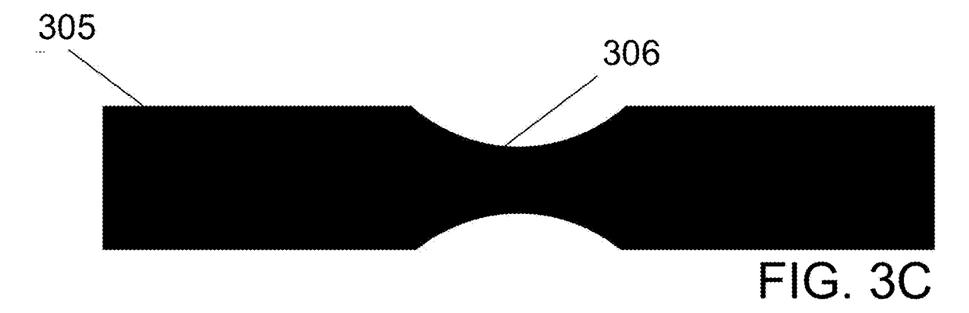
FIG. 3C illustrates another waveguide in accordance with an example of this disclosure.

FIG. 3A illustrates a waveguide (e.g., 13, 17) 301 which includes a notch 302 (3), in accordance with an example of this disclosure. FIG. 3B illustrates another waveguide (e.g., 13, 17) 303 which includes also includes a notch 304 (3), in accordance with an example of this disclosure. FIG. 3C illustrates another waveguide 305 (e.g., 13, 17) with a notch 306 (3), in accordance with an example of this disclosure. Notch 304 is greater than notch 302. Notch 306 is greater than notch 304 and notch 302. As discussed, amplitude can be optimized to match 3 dB by creating a notch 302, 304, 306 in the waveguides. Each notch 302, 304, 306 scatters some amount of light out of the waveguide. As the notch 302, 304, 306 impinges further on the waveguide more light is lost and the amplitude of the resulting signal is reduced.

The notches 302, 304, 306 can be curved, as shown and a notch can be included on opposite sides of the waveguide and aligned with each other, or fully about the entire outer perimeter of the waveguide. Notch sizing 302, 304, 306 and placement (e.g., 3) is implemented so that the signals received at the couplers (e.g., 6a-6d) will be matched (106).

Each switch 4 is driven by one bit of the digital data. The most significant bit 25 drives the switch 4 in the path (e.g., 13) with the most optical power, and the least significant bit 26 drives the switch 4 in the path with the least optical power. The electrical digital input for each switch 4 is either zero (0) or one (1), depending on the input signal. The optical wave (weighted laser) passes through switch 4 when the digital input signal is "1" and is blocked when the digital input signal is "0"). The intensity of the optical signals is combined incoherently by optical combiners 6.

Figure 4A:
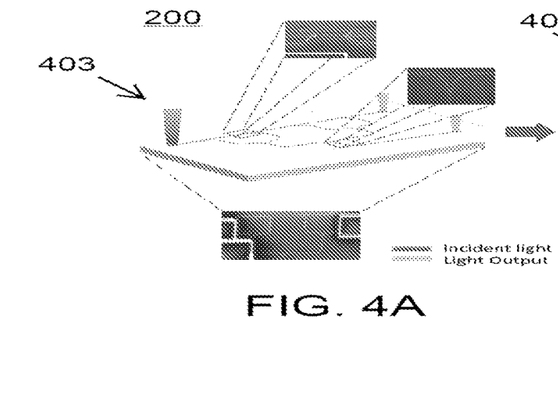
FIG. 4A is a scanning electron microscope image of a digital-to-analog converter in accordance with an example of this disclosure.
Figure 4B:
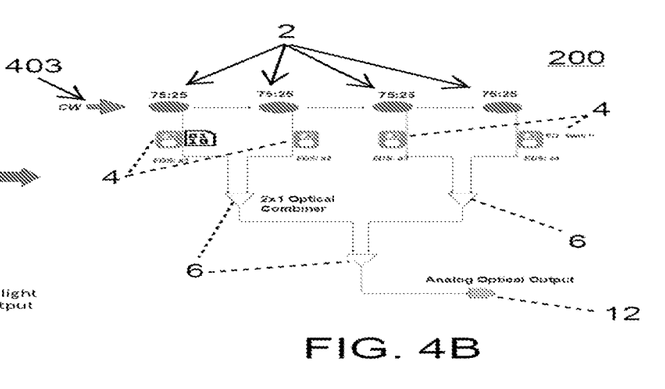
FIG. 4B is a block diagram of a digital-to-analog converter in accordance with an example of this disclosure.

FIG. 4A is a scanning electron microscope image of a digital-to-analog converter 200 in accordance with an example of this disclosure. FIG. 4B is a block diagram of an N-bit digital-to-analog converter 200 in accordance with an example of this disclosure. In digital-to-analog converter 200, the sequential input binary digital signals are converted into the optical analog output which is given by Equation 1, shown below, in which at are the binary statue of the electro-optical switch of order i and $G_{ref}$ is a reference value.

$$S_{out} = \left(\sum_{1}^{N} a_i 2^{-n}\right) G_{ref} \quad (1)$$

A carrier wave 403 is received by the digital-to-analog converter 200 and split with a certain ratio with a series of asymmetric directional couplers 2. Each bit of optical power is selected as "on" state or an "off" state by an electro-optical switch 4 to represent the digital signal 403 from the most significant bit (see 25, FIG. 2A) to the least significant bit (see 26, FIG. 2A). The resulting optical signal is summed in phase with a sequence of 3-dB y-combiners 6 to obtain a linear amplitude output (from combiner 10). In at least one example of this disclosure, the design of a digital-to-analog converter 200 is based on the summation of the corresponding electrical fields of each bit which are generated in a photonic digital-to-analog converter which are assumed to be in-phase. A series of asymmetrical silicon photonic directional couplers 2 are inserted in the path from most significant bit (25) to the least significant bit (26) which meet the requirement for high attenuations at lower values. In at least one example of this disclosure, the splitting ratio of the directional couplers 2 is set to 1:3 (one to three) for which a linearly output electrical field amplitude is gained. Seventy-five percent (¾) of the optical power from the carrier wave 403 laser source is injected into the most significant bit (25), then (¼)·(¾) is injected in the next lower bit until to the $n^{th}$ bit with an injected power of $(¼)^{(n-1)} \cdot (¾)$.

Figure 5A:
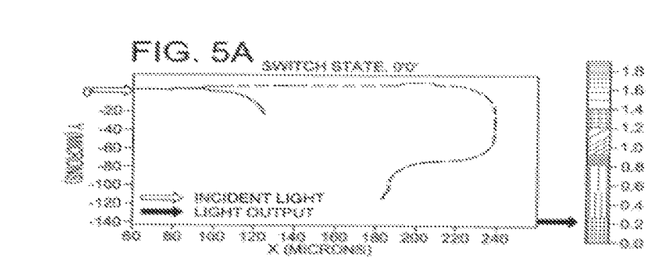
FIG. 5A illustrates an electrical field distribution of a 2-bit digital-to-analog converter in accordance with an example of this disclosure.

FIG. 5A illustrates an electrical field distribution of a 2-bit digital-to-analog converter 200 in which the switch corresponding to the most significant bit is false (zero, off) and the switch corresponding to the least significant bit is false (zero, off).

Figure 5B:
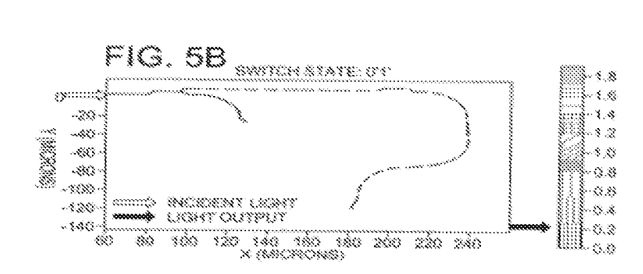
FIG. 5B illustrates another electrical field distribution of the 2-bit digital-to-analog converter of FIG. 5A.

FIG. 5B illustrates an electrical field distribution of a 2-bit digital-to-analog converter 200 in which the switch corresponding to the most significant bit is false (zero, off) and the switch corresponding to the least significant bit is true (one, on).

Figure 5C:
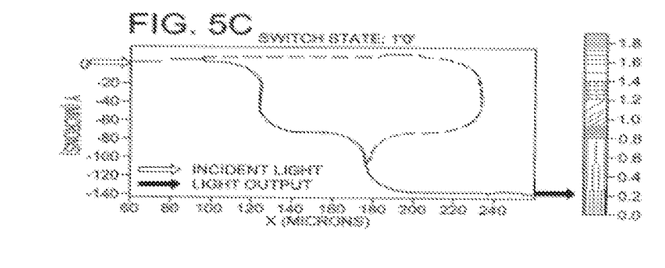
FIG. 5C illustrates another electrical field distribution of the 2-bit digital-to-analog converter of FIG. 5A and FIG. 5B.

FIG. 5C illustrates an electrical field distribution of a 2-bit digital-to-analog converter 200 in which the switch corresponding to the most significant bit is true (one, on) and the switch corresponding to the least significant bit is false (zero, off).

Figure 5D:
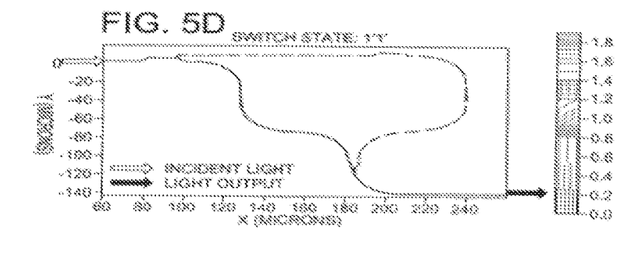
FIG. 5D illustrates another electrical field distribution of the 2-bit digital-to-analog converter of FIG. 5A, FIG. 5B, and FIG. 5C.

FIG. 5D illustrates an electrical field distribution of a 2-bit digital-to-analog converter 200 in which the switch corresponding to the most significant bit is true (one, on) and the switch corresponding to the least significant bit is true (one, on).

In at least one example of this disclosure, the optical digital to analog converter 200 produces an analog optical signal with an electric field amplitude linearly proportional to the value represented by the bits of the digital signal. Where F(t) is the time varying signal represented by the bits of the digital signal, the electric field output, $E_{out}$, will be:

$$E_{out} = F(t) E_{in} e^{i(kx-\omega t)} \quad \text{(Eq. 2)}$$

However, in terms of intensity the output will be the square of the electric field:

$$I_{out} = |F(t) E_{in} e^{i(kx-\omega t)}|^2 \quad \text{(Eq. 3)}$$

In at least one example of this disclosure, the optical digital-to-analog converter 200 is ideal for use in applications where the signal needs to be represented linearly in terms of the electric field rather than in terms of intensity. Such applications include optical signal processing where a lens converts a coherent spatial signal into its Fourier transform in terms of the electric field and optical neural networks where modulating in terms of the electric fields allows the use of a photodetector as a squaring nonlinear activation function.

Figure 6A:
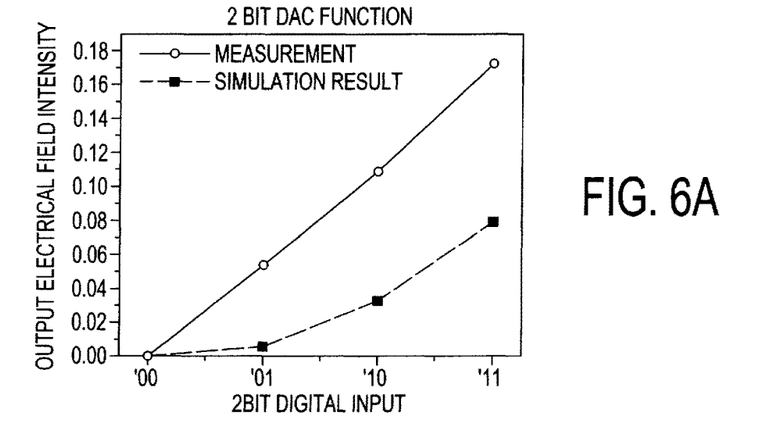
FIG. 6A is a plot of a measured output and a simulated output of a 2-bit digital-to-analog converter in accordance with an example of this disclosure.

FIG. 6A is a plot of a measured output and a simulated output of a 2-bit digital-to-analog converter 200 in accordance with an example of this disclosure. The output electrical field intensity (vertical axis) is plotted against the 2-bit modulating digital input (horizontal axis).

Figure 6B:
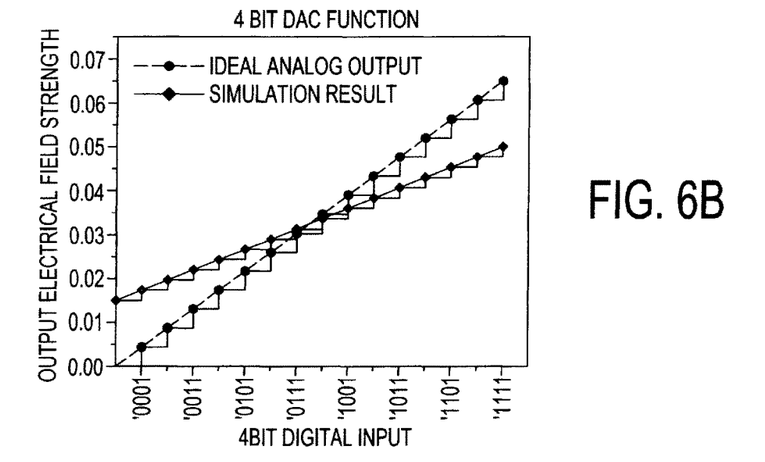
FIG. 6B is a plot of an ideal output and a simulated output of a 4-bit digital-to-analog converter in accordance with an example of this disclosure.

FIG. 6B is a plot of an ideal output and a simulated output of a 4-bit digital-to-analog converter in accordance with an example of this disclosure. The output electrical field strength (vertical axis) is plotted against the 4-bit modulating digital input (horizontal axis).

Figure 6C:
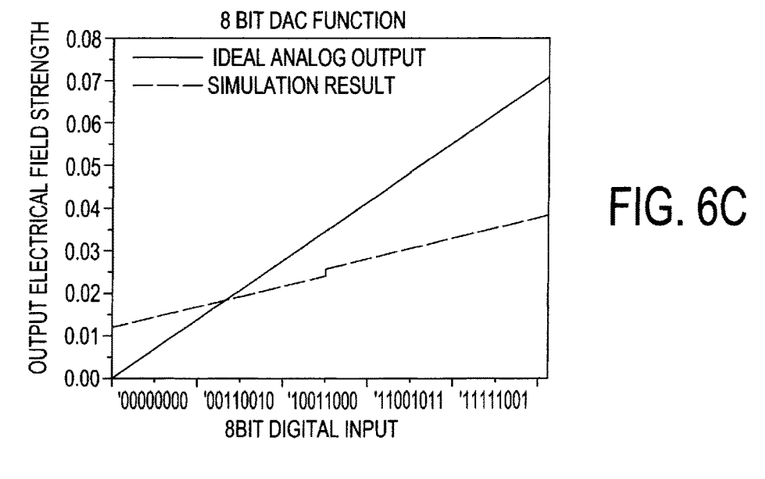
FIG. 6C is a plot of an ideal output and a simulated output of an 8-bit digital-to-analog converter in accordance with an example of this disclosure.

FIG. 6C is a plot of an ideal output and a simulated output of an 8-bit digital-to-analog converter in accordance with an example of this disclosure. The output electrical field strength (vertical axis) is plotted against the 8-bit modulating digital input (horizontal axis).

Figure 7A:
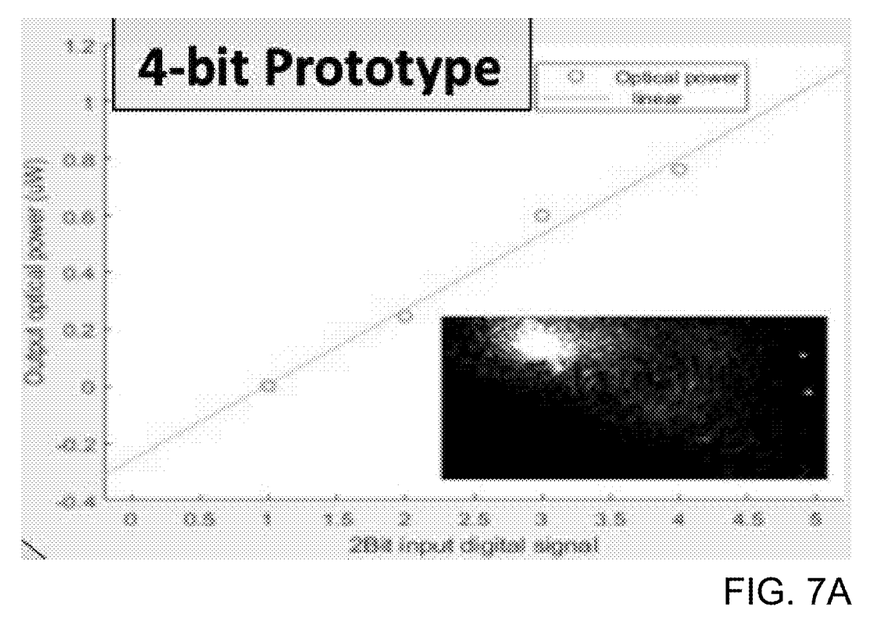
FIG. 7A is a plot of a measured output of a 4-bit digital-to-analog converter in accordance with an example of this disclosure.

FIG. 7A is a plot of a measured output of a 4-bit digital-to-analog converter 200 in accordance with an example of this disclosure. Output optical power (vertical axis) is plotted against a 4-bit input digital signal (y-axis).

Figure 7B:
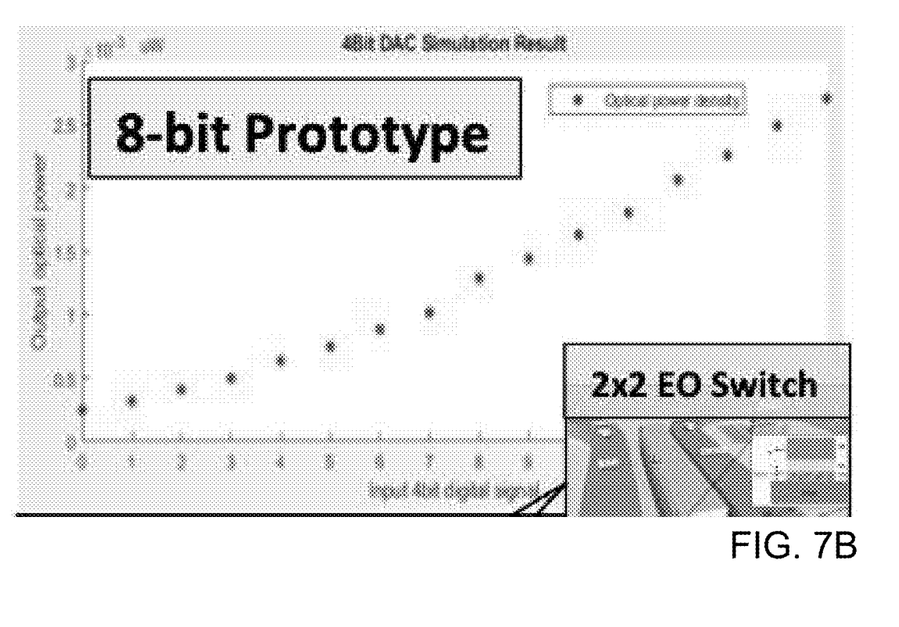
FIG. 7B is a plot of a measured output of an 8-bit digital-to-analog converter in accordance with an example of this disclosure.

FIG. 7B is a plot of a measured output of an 8-bit digital-to-analog converter 200 in accordance with an example of this disclosure. Output optical power (vertical axis) is plotted against an 8-bit input digital signal (y-axis).

Aspects of at least one example of a digital-to-analog converter 200 are compared to an electronic on-chip converter and an electronic off-chip convert in Table 1, shown below:

TABLE 1

|  | Speed (GS/s) | Power (mW) | FOM (GS/s-mW) | Footprint (mm²) | Resolution (bits) |
|---|---|---|---|---|---|
| Electronic On-chip DAC | 6 | 350 | 0.02 | 0.52 | 16 |
| Electronic Off-chip DAC | 100 | 2500 | 0.04 | ~200,000 | 6 |

TABLE 1-continued

| | Speed (GS/s) | Power (mW) | FOM (GS/s-mW) | Footprint (mm²) | Resolution (bits) |
|---|---|---|---|---|---|
| Photonic DAC 200 | <40 (switch-speed limited) | 40[3] | 1 | 0.4 × 0.8 = 0.32 | 8 (goal) |

Examples of this disclosure include:

Example 1. A digital-to-analog converter (200), comprising: a first interface (1); and a second interface (11) coupled to the first interface (1) through one or more modulation circuits (21, 22, 23, 24). Each of the one or more modulation circuits (21, 22, 23, 24) comprises: a first 3-dB coupler (2) connected to the first interface (1); a first waveguide (13) comprising a first lead (14) connected to the first 3-dB coupler (2), a first end (15), and a first length (16) running therebetween, wherein the first lead (14) and the first end (15) are coupled by a first switch (4) positioned along the first length (16); a second 3-dB coupler (2) connected to the first interface (1); a second waveguide (17) comprising a second lead (18) connected to the second 3-dB coupler (2), a second end (19), and a second length (20) running therebetween, wherein the second lead (18) and the second end (19) are coupled by a second switch (4) positioned along the second length (20); and an optical combiner (6) connected to the first end (15) of the first waveguide (13) and the second end (19) of the second waveguide (17), wherein the second interface (11) is connected to the optical combiner (6) of each of the one or more modulation circuits.

Example 2. The digital-to-analog converter (200) of example 1, wherein the first switch (4) comprises a first electro-optical switch connected to a first electrical output, and the second switch (4) comprises a second electro-optical switch connected to a second electrical output.

Example 3. The digital-to-analog converter (200) of example 2, wherein the first waveguide (13) is connected along the first length (16) to one or more first thermal regulators (12), and the second waveguide (17) is connected along the second length (20) to one or more second thermal regulators (12).

Example 4. The digital-to-analog converter (200) of example 3, wherein the first waveguide (13) is notched (302) along one or more first portions of the first length (16).

Example 5. The digital-to-analog converter (200) of example 4, wherein the first waveguide (13) is serpentine along one or more first portions of the first length (16).

Example 6. The digital-to-analog converter (200) of example 5, wherein the second waveguide (17) is notched (302) along one or more first portions of the second length (20).

Example 7. The digital-to-analog converter (200) of example 6, wherein the first waveguide (13) is serpentine along one or more first portions of the first length (16).

Example 8. The digital-to-analog converter (200) of example 7, wherein the second interface (11) is connected to the optical combiner (6) of each of the one or more modulation circuits through a third waveguide.

Example 9. The digital-to-analog converter (200) of example 8, wherein the one or more modulation circuits comprises at least two modulation circuits, and wherein each third waveguide is connected to the second interface through a second optical combiner and a fourth waveguide interposed between the second optical combiner and the second interface.

Example 10. The digital-to-analog converter (200) of example 9, wherein the first interface (1) comprises a first grating coupler and the second interface comprises a second grating coupler.

Example 11. A method (200) of converting an electrical signal to a photonic, comprising; receiving, at a grating coupler, a light wave from a light source; splitting the light wave into a plurality of sub-waves using a plurality of two or more seriated 3-dB couplers; directing the plurality of sub-waves through two or more waveguides, wherein each of the two or more waveguides comprises an electro-optical switch; modulating the plurality of sub-waves in accordance with one or more electrical inputs received at each electro-optical switch; and combining the plurality of modulated sub-waves to form a modulated photonic signal.

Example 12. The method (200) of example 11, further comprising: matching the amplitudes of the plurality sub-waves using a notched (302) region along one or more of the two or more waveguides.

Example 13. The method (200) of example 11, further comprising: matching the lengths of the plurality of modulated sub-waves using a serpentine portion along one or more of the two or more waveguides.

Example 14. The method (200) of example 11, further comprising: putting a first modulated sub-wave from among the plurality of modulated sub-waves into phase with a second modulated sub-wave from among the plurality of modulated sub-waves by actively controlling the phase of the first modulated sub-wave.

Example 15. The method (200) of example 14, wherein putting the first modulated sub-wave from among the plurality of modulated sub-waves into phase with the second modulated sub-wave from among the plurality of modulated sub-waves by actively controlling the phase of the first modulated sub-wave is done iteratively.

Example 16. The method (200) of example 11, wherein combining the plurality of modulated sub-waves to form the modulated photonic signal comprises passing the plurality of modulated sub-waves through a 3-dB binary logic circuit.

Example 17. A system on chip including an electro-optical transducer (200), the electro-optical transducer (200) comprising: a first interface (1); and a second interface (11) coupled to the first interface (1) through one or more modulation circuits (21, 22, 23, 24), wherein each of the one or more modulation circuits (21, 22, 23, 24) comprises: a first 3-dB coupler (2) connected to the first interface (1); a first waveguide (13) comprising a first lead (14) connected to the first 3-dB coupler (2), a first end (15), and a first length (16) running therebetween, wherein the first lead (14) and the first end (15) are coupled by a first switch (4) positioned along the first length (16); a second 3-dB coupler (2) connected to the first interface (1); a second waveguide (17) comprising a second lead (18) connected to the second 3-dB coupler (2), a second end (19), and a second length (20) running therebetween, wherein the second lead (18) and the second end (19) are coupled by a second switch (4) positioned along the second length (20) (20); and an optical combiner (6) connected to the first end (15) of the first waveguide (13) and the second end (19) of the second waveguide (17), wherein an input of the second interface (11) is connected to the optical combiner (6) of each of the one or more modulation circuits, and wherein an output of the second interface is connected to a processing device such as a processor.

Example 18. The electro-optical transducer of example 17, wherein the first switch (4) comprises a first electro-optical switch connected to a first electrical output, and the second switch (4) comprises a second electrooptical switch connected to a second electrical output.

Example 19. The electro-optical transducer of example 17, wherein the first waveguide (13) is connected along the first length (16) to one or more first thermal regulators (12), and the second waveguide (17) is connected along the second length (20) to one or more second thermal regulators (12).

Example 20. The electro-optical transducer of example 17, wherein the first waveguide (13) is notched (302) along one or more first portions of the first length (16).

Certain terms have been used throughout this description and the claims to refer to particular system components. As one skilled in the art should appreciate, different parts may refer to a component by different names. This document does not intend to distinguish between components that differ in name but not function. In this disclosure and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. A "connection" includes a physical connection which may be direct, in which there are no intermediate components between the connected components, and indirect connections, in which there are one or more components between the indirectly connected components. All words in this application are used in the same sense as those words are used by persons of skill in the art to which this disclosure belongs.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A digital-to-analog converter, comprising:
   a first interface; and
   a second interface coupled to the first interface through one or more modulation circuits, wherein each of the one or more modulation circuits comprises:
   a first splitting coupler connected to the first interface;
   a first waveguide comprising a first lead connected to the first splitting coupler, a first end, and a first length running therebetween, wherein the first lead and the first end are coupled by a first switch positioned along the first length;
   a second splitting coupler connected to the first interface;
   a second waveguide comprising a second lead connected to the second splitting coupler, a second end, and a second length running therebetween, wherein the second lead and the second end are coupled by a second switch positioned along the second length; and
   an optical combiner connected to the first end of the first waveguide and the second end of the second waveguide,
   wherein the second interface is connected to the optical combiner of each of the one or more modulation circuits.

2. The digital-to-analog converter of claim 1, wherein the first switch comprises a first electro-optical switch connected to a first electrical output, and the second switch comprises a second electro-optical switch connected to a second electrical output.

3. The digital-to-analog converter of claim 2, wherein the first waveguide is connected along the first length to one or more first thermal regulators, and the second waveguide is connected along the second length to one or more second thermal regulators.

4. The digital-to-analog converter of claim 3, wherein the first waveguide is notched along one or more first portions of the first length.

5. The digital-to-analog converter of claim 4, wherein the first waveguide is serpentine along one or more first portions of the first length.

6. The digital-to-analog converter of claim 5, wherein the second waveguide is notched along one or more first portions of the second length.

7. The digital-to-analog converter of claim 6, wherein the first waveguide is serpentine along one or more first portions of the first length.

8. The digital-to-analog converter of claim 7, wherein the second interface is connected to the optical combiner of each of the one or more modulation circuits through a third waveguide.

9. The digital-to-analog converter of claim 8, wherein the one or more modulation circuits comprises at least two modulation circuits, and wherein each third waveguide is connected to the second interface through a second optical combiner and a fourth waveguide interposed between the second optical combiner and the second interface.

10. The digital-to-analog converter of claim 9, wherein the first interface comprises a first grating coupler and the second interface comprises a second grating coupler.

11. A method of converting an electrical signal to a photonic, comprising:
    receiving, at a grating coupler, a light wave from a light source;
    splitting the light wave into a plurality of sub-waves using a plurality of two or more seriated 3-dB couplers;
    directing the plurality of sub-waves through two or more waveguides, wherein each of the two or more waveguides comprises an electro-optical switch;
    modulating the plurality of sub-waves in accordance with one or more electrical inputs received at each electro-optical switch; and
    combining the plurality of modulated sub-waves to form a modulated photonic signal.

12. The method of claim 11, further comprising:
    matching the amplitudes of the plurality sub-waves using a notched region along one or more of the two or more waveguides.

13. The method of claim 11, further comprising:
    matching the lengths of the plurality of modulated sub-waves using a serpentine portion along one or more of the two or more waveguides.

14. The method of claim 11, further comprising:
    putting a first modulated sub-wave from among the plurality of modulated sub-waves into phase with a second modulated sub-wave from among the plurality of modulated sub-waves by actively controlling the phase of the first modulated sub-wave.

15. The method of claim 14, wherein putting the first modulated sub-wave from among the plurality of modulated sub-waves into phase with the second modulated sub-wave from among the plurality of modulated sub-waves by actively controlling the phase of the first modulated sub-wave is done iteratively.

16. The method of claim 11, wherein combining the plurality of modulated sub-waves to form the modulated photonic signal comprises passing the plurality of modulated sub-waves through a 3-dB binary logic circuit.

17. A system on chip including an electro-optical transducer, the electro-optical transducer comprising:
- a first interface; and
- a second interface coupled to the first interface through one or more modulation circuits, wherein each of the one or more modulation circuits comprises:
- a first splitting coupler connected to the first interface;
- a first waveguide comprising a first lead connected to the first splitting coupler, a first end, and a first length running therebetween, wherein the first lead and the first end are coupled by a first switch positioned along the first length;
- a second splitting coupler connected to the first interface;
- a second waveguide comprising a second lead connected to the second splitting coupler, a second end, and a second length running therebetween, wherein the second lead and the second end are coupled by a second switch positioned along the second length; and
- an optical combiner connected to the first end of the first waveguide and the second end of the second waveguide,
- wherein an input of the second interface is connected to the optical combiner of each of the one or more modulation circuits, and
- wherein an output of the second interface is connected to a processor.

18. The electro-optical transducer of claim 17, wherein the first switch comprises a first electro-optical switch connected to a first electrical output, and the second switch comprises a second electro-optical switch connected to a second electrical output.

19. The electro-optical transducer of claim 17, wherein the first waveguide is connected along the first length to one or more first thermal regulators, and the second waveguide is connected along the second length to one or more second thermal regulators.

20. The electro-optical transducer of claim 17, wherein e first waveguide is notched along one or more first portions of the first length.

\* \* \* \* \*